(12) United States Patent
Takanashi et al.

(10) Patent No.: US 6,539,834 B1
(45) Date of Patent: Apr. 1, 2003

(54) SLIDE TABLE UNIT

(75) Inventors: Seiji Takanashi, Ibaraki (JP); Satoshi Suzuki, Ibaraki (JP)

(73) Assignee: SMC Corporation, Tokyo (JP)

( * ) Notice: Subject to any disclaimer, the term of this patent is extended or adjusted under 35 U.S.C. 154(b) by 333 days.

(21) Appl. No.: 09/668,149

(22) Filed: Sep. 25, 2000

(30) Foreign Application Priority Data

Oct. 13, 1999 (JP) ............................................. 11-291149

(51) Int. Cl.[7] .................................................. F01B 11/02
(52) U.S. Cl. ........................... 92/85 R; 92/88; 92/165 R
(58) Field of Search ....................... 92/85 R, 88, 165 R

(56) References Cited

U.S. PATENT DOCUMENTS 5,511,461 A * 4/1996 Miyachi et al. ........... 92/165 R
6,014,924 A * 1/2000 Stoll et al. ................. 92/85 R

FOREIGN PATENT DOCUMENTS

| DE | 196 03 446 | 8/1996 |
| JP | 8-152007 | 6/1996 |
| JP | 8-159106 | 6/1996 |
| JP | 8-213796 | 8/1996 |

* cited by examiner

Primary Examiner—Edward K. Look
Assistant Examiner—Michael Leslie
(74) Attorney, Agent, or Firm—Oblon, Spivak, McClelland, Maier & Neustadt, P.C.

(57) ABSTRACT

Two rods 2 and 3 disposed in parallel to each other are supported through hydrostatic bearings 8 and 9 on a main body block 1, one end portions of the rods project from opposite faces facing each other of the main body block, and the projecting ends of the rods 2 and 3 projecting from the main body block are respectively fixed to both 15*a* and 15*b* of a table 15 surrounding the main body block including the opposite face sides from which the rods project.

5 Claims, 2 Drawing Sheets

SLIDE TABLE UNIT

TECHNICAL FIELD

The present invention relates to a slide table unit for retaining and linearly carrying a workpiece, a head of a tool, or the like.

PRIOR ART

A cylinder system in which a rod of a piston is supported by a hydrostatic bearing provided to a cylinder block is disclosed in Japanese Patent Application Laid-open No. 8-159106 and the like, for example. In the cylinder system, because it is necessary to provide means for increasing rigidity for resisting a moment load applied to on the rod and for suppressing rotation of the rod so as to allow the rod to slide stably, a whole device may be upsized. Especially, if a single piston rod is supported by hydrostatic bearings in a plurality of positions at a distance from each other so as to increase rigidity of the rod for resisting the moment load, upsizing of the device as a whole is inevitable.

DISCLOSURE OF THE INVENTION

It is a technical object of the present invention to solve the problems of the above cylinder system and to provide a compact slide table unit which has a simple and small structure and high rigidity for resisting a moment load applied to rods and in which rotation about the rods is not generated as well.

It is another technical object of the invention to provide the slide table unit with a structure that allows easy production of the above slide table unit.

To achieve the above objects, according to the invention, there is provided a slide table unit comprising a main body block having therein two rod support holes which are parallel to each other, a table for carrying a workpiece and disposed on the main body block for linear movement, hydrostatic bearings respectively provided in the rod support holes, and two rods respectively supported in noncontact states in the rod support holes through the hydrostatic bearings such that the rods can expand and contract.

Each the hydrostatic bearing is formed of a porous sleeve and has a function of supporting the rod in the noncontact state by compressed air supplied between an inside of the sleeve and the rod through the sleeve. One of the two rods projects outward from one end face of the main body block, the other of the two rods projects outward from the other end face on an opposite side of the main body block, projecting tip end portions of the rods are respectively connected to the table, base end faces of the respective rods are formed as pressure receiving faces, and the table is moved by alternately applying fluid pressure to the pressure receiving faces of the two rods to cause the rods to operate.

In the slide table unit of the invention having the above structure, because the table is moved by the two parallel rods supported by the hydrostatic bearings, rigidity for resisting the moment load is high and the table does not rotate about the rods. Moreover, the structure is simple and can be miniaturized.

Such a slide table unit can be used advantageously in a case in which the workpiece or a head and the like of a tool is retained and moved, e.g., a case in which a vacuum adsorbing portion for adsorbing the workpiece is provided to the table end to adsorb the workpiece while pressing the workpiece.

According to a concrete embodiment of the invention, the table includes two end plate portions facing the two end faces of the main body block from which the rods project and a connecting portion connecting the end plate portions such that the table is formed into a frame shape surrounding the opposite end faces and one side face of the main body block and each of the two end plate portions is connected to one of the two rods.

It is preferable that the table is fixed to one of the rods through a bolt and fixed to the other through an adhesive. In fixing the table to the rod through the adhesive, by bonding the table to the rod in a state in which compressed air is supplied to the hydrostatic bearings, it is possible to fix the table to the rod in a state in which the two rods are accurately positioned in parallel to each other and without displacements of cores in the two rod support holes of the main body block.

Dampers for absorbing shock in collision with stroke ends may be respectively mounted to the pressure receiving faces of the two rods.

DETAILED DESCRIPTION

Figure 1:
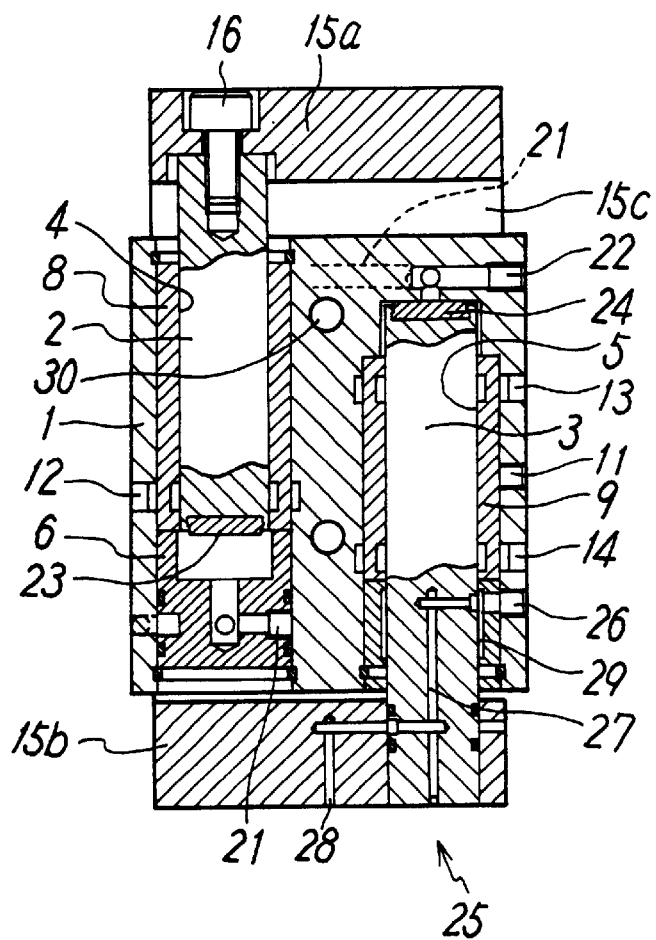
FIG. 1 is a sectional view showing an embodiment of a slide table unit according to the present invention.

FIG. 1 shows an embodiment of a slide table unit according to the present invention. The slide table unit has a main body block 1 and two rod support holes 4 and 5 for supporting two rods 2 and 3 for sliding and in parallel to each other are formed in the main body block 1. The one rod support hole 4 passes through the main body block 1 in an axial direction and has one end airtightly closed with a cap 6. The other rod support hole 5 is a hole having a bottom and formed by cutting the main body block 1 from one end face side, i.e., a side on which the rod support hole 4 is closed with the cap 6 to a midway point of the main body block 1. The rod support holes 4 and 5 can be processed from the one end side of the main body block 1, which is advantageous to improvement in processing accuracy.

Hydrostatic bearings 8 and 9 are respectively provided in the two rod support holes 4 and 5 and the rods 2 and 3 are supported for sliding in the respective rod support holes 4 and 5 through the hydrostatic bearings 8 and 9. One end portions of the respective rods 2 and 3 project outward in reverse directions to each other from end faces positioned on opposite sides of the main body block 1 and are respectively fixed to a table 15.

The hydrostatic bearings 8 and 9 are formed of porous tubular members and have supply flow paths 10 and 11 around the hydrostatic bearings 8 and 9. By causing the rods 2 and 3 to float from tube inner faces by compressed air supplied into the hydrostatic bearings 8 and 9 from the supply flow paths 10 and 11, the rods are supported in a noncontact state with substantially no sliding resistance. Reference numerals 12 to 14 in the drawings designate discharge holes for air discharged through the hydrostatic bearings 8 and 9.

The table 15 retained on the main body block 1 includes two end plate portions 15a and 15b positioned to face opposite end faces of the main body block 1 and a connecting portion 15c for connecting the end plate portions 15a and 15b. The table 15 is formed of those members into a frame shape surrounding the opposite end faces and one side face of the main body block 1. The end plate portions 15a, 15b, and the connecting portion 15c may be formed individually and connected to one another as shown in the drawings or may be formed integrally from a single piece of material. An arbitrary accessory portion can be attached to the table 15 if the table 15 has at least the frame-shaped portion surrounding the main body block 1 and if operation of the table 15 which will be described below is not hindered by such an accessory portion.

The respective projecting ends of the rods 2 and 3 projecting from the main body block 1 are fixed to the end plate portions 15a and 15b of the table 15. The one end plate 15a and the rod 2 are fixed to each other through a bolt 16 screwed down through the end plate 15a and the other end plate 15b and the rod 3 are fixed to each other by fitting and bonding the rod 3 into a mounting hole in the end plate 15b. The rod 3 and the end plate 15b are fixed to each other in a state in which compressed air is supplied to the hydrostatic bearings 8 and 9. As a result, it is possible to fix the two rods 2 and 3 to the table 15 in a state in which the rods 2 and 3 are accurately positioned in parallel to each other and without displacements of cores in the two rod support holes 4 and 5 of the main body block 1.

Supply/discharge flow paths 21 and 22 for pressure fluid are formed in the main body block 1 and inner end faces of both the rods 2 and 3 are formed as pressure-receiving faces. By supplying the pressure fluid from the flow paths 21 and 22 and applying the pressure fluid to the pressure receiving faces of both the rods 2 and 3, the table 15 is driven linearly along the main body block 1. The pressure fluid supplied from the supply/discharge flow paths 21 and 22 is supplied through regulators by which pressure can be adjusted individually by set voltage.

Dampers 23 and 24 respectively formed of resilient bodies are mounted to the inner end faces of the rods 2 and 3 so as to prevent generation of shock if the rods 2 and 3 collide with the inner ends of the rod support holes 4 and 5 in the main body block 1.

It is possible to provide a vacuum adsorbing portion 25 for adsorbing and retaining a workpiece or the like to a lower end of the table 15. The vacuum adsorbing portion 25 is formed by causing a vacuum port 26 provided to the main body block 1 to communicate with a suction hole 28 at a center of the end plate portion 15b through a passage 27 in the rod 3. The suction hole 28 communicates with an adsorbed member such as the workpiece to be mounted to the end plate portion 15b. The vacuum port 26 of the main body block 1 and the passage 27 in the rod 3 constantly communicate with each other through a flow path groove 29 regardless of an axial movement position of the rod 3.

Such a vacuum adsorbing portion 25 can be used advantageously in adsorbing the workpiece while pressing the workpiece, but other retaining means not using vacuum can be also provided.

Figure 2:
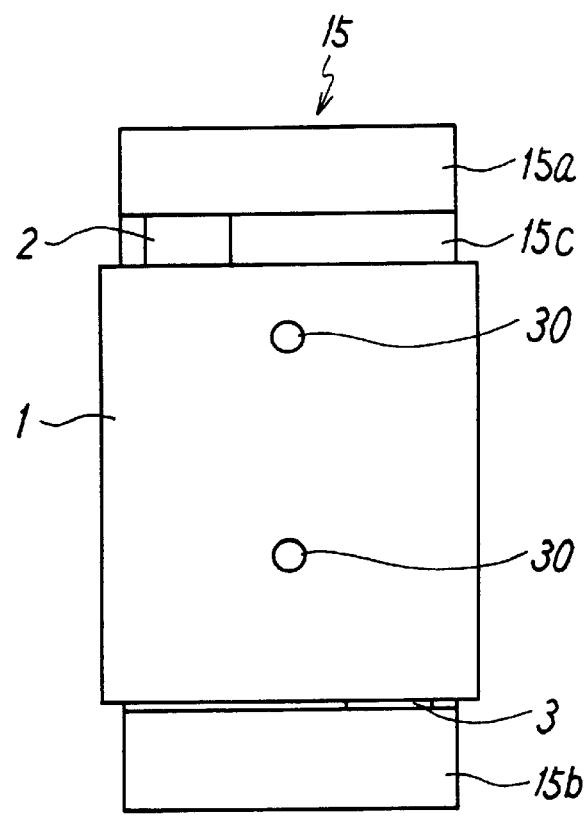
FIG. 2 is a front view of the embodiment.
Figure 3:
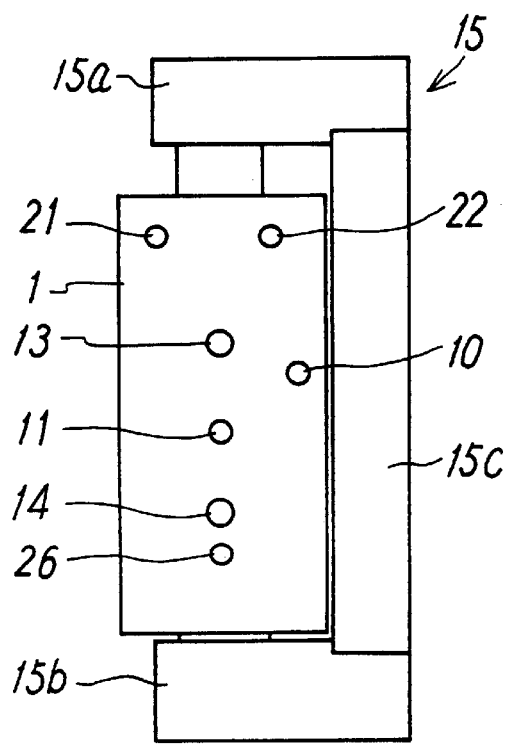
FIG. 3 is a side view of the embodiment.

In FIGS. 1 and 2, a reference numeral 30 designates mounting holes used for fixing the main body block in a required position.

In the slide table unit having the above structure, by applying fluid pressure to either one of the two rods 2 and 3 supported through the hydrostatic bearings 8 and 9 on the main body block 1 to cause the rod to operate, the table 15 is driven in the applied direction of the fluid pressure. In this case, the other rod 3 or 2 that is not applied with the fluid pressure follows and moves in the axial direction by driving force transmitted through the table 15 from the rod driven by the fluid pressure.

In the slide table unit, because both the rods 2 and 3 are supported through the hydrostatic bearings 8 and 9 on the main body block 1, the rods 2 and 3 can be supported in the noncontact state with substantially no sliding resistance by compressed air supplied from the supply flow paths 10 and 11 of the main body block 1.

Because the end portions of the two parallel rods 2 and 3 project from opposite end faces of the main body block 1 and are respectively fixed to the table 15, rigidity for resisting the moment load that acts on the rods is higher as compared with that in a case of using a single rod and rotation of the table about the rods is not generated. Therefore, it is possible to form a structure of the slide table unit as a simple and miniaturized structure.

According to the slide table unit of the invention described above in detail, by supporting the two rods disposed in parallel to each other and provided to the table through the hydrostatic bearings on the main body block, the compact slide table unit that has a simple and small structure and high rigidity for resisting the moment load applied to the rods and in that rotation is not generated about the rods can be obtained. Moreover, the slide table unit in that the two rods disposed in parallel to each other can be easily and accurately mounted can be obtained.

What is claimed is:

1. A slide table unit comprising a main body block having therein two rod support holes which are parallel to each other, a table for carrying a workpiece and disposed on said main body block for linear movement, hydrostatic bearings respectively provided in said rod support holes, and two rods respectively supported in noncontact states in said rod support holes through said hydrostatic bearings such that said rods can expand and contract, wherein each said hydrostatic bearing is formed of a porous sleeve and has a function of supporting said rod in said noncontact state by compressed air supplied between an inside of said sleeve and said rod through said sleeve, and one of said two rods projects outward from one end face of said main body block, the other of said two rods projects outward from the other end face on an opposite side of said main body block, projecting ends of said rods are respectively connected to said table, base end faces of said respective rods are formed as pressure receiving faces, and said table is moved by alternately applying fluid pressure to said pressure receiving faces of said two rods to cause said rods to operate.

2. A slide table unit according to claim 1, wherein said table includes two end plate portions facing said two end faces of said main body block from which said rods project and a connecting portion connecting said end plate portions such that said table is formed into a frame shape surrounding said opposite end faces and one side face of said main body block and each of said two end plate portions is connected to one of said two rods.

3. A slide table unit according to claim 1, wherein said table is fixed to one of said rods through a bolt and fixed to the other through an adhesive.

4. A slide table unit according to claim 2, wherein one of said end plate portions of said table is fixed to said rod through a bolt and the other is fixed to said rod through an adhesive.

5. A slide table unit according to claim 1, wherein dampers formed of resilient bodies for absorbing shock in collision with stroke ends are respectively mounted to said pressure receiving faces of said two rods.

* * * * *